United States Patent [19]
Dorsel

[11] Patent Number: 5,973,839
[45] Date of Patent: Oct. 26, 1999

[54] OPTICAL HOMOGENIZER

[75] Inventor: Andreas N. Dorsel, Menlo Park, Calif.

[73] Assignee: Hewlett-Packard Company, Palo Alto, Calif.

[21] Appl. No.: 09/035,369

[22] Filed: Mar. 5, 1998

[51] Int. Cl.[6] .................................................. G02B 5/02
[52] U.S. Cl. ................ 359/599; 250/559.17; 250/227.11
[58] Field of Search ........................... 250/200, 559.01, 250/559.06, 559.17, 227.11, 227.26; 359/599

[56] References Cited

U.S. PATENT DOCUMENTS

| | | | |
|---|---|---|---|
| 1,297,658 | 3/1919 | Cantrell et al. | 301/111 |
| 1,912,156 | 5/1933 | Owens | 369/112 |
| 2,246,501 | 6/1941 | Bradner et al. | 356/429 |
| 4,277,174 | 7/1981 | Kleesattel | 356/372 |
| 4,595,947 | 6/1986 | Brueggemann | 358/75 |
| 4,797,000 | 1/1989 | Curtis | 356/436 |
| 4,818,861 | 4/1989 | Horiuchi et al. | 250/235 |
| 4,866,464 | 9/1989 | Straayer | 250/235 |
| 4,952,946 | 8/1990 | Clark et al. | 346/108 |
| 5,079,424 | 1/1992 | Kobayashi | 250/369 |
| 5,796,508 | 8/1998 | Suzuki | 359/224 |

*Primary Examiner*—Scott J. Sugarman
*Assistant Examiner*—Margaret Burke

[57] ABSTRACT

An optical homogenizer is disclosed which enables an optical system to obtain the benefits of a high quantum efficiency photon detector without suffering from its non-uniform response. The optical homogenizer has an input end for receiving light emitted from a light source and an output end that produces a relatively uniform distribution of light along a spatial dimension of the photon detector in response to the light source. The optical homogenizer ensures that the photon detector is uniformly illuminated from the output end regardless of where photons from the light source enter the input end.

21 Claims, 3 Drawing Sheets

OPTICAL HOMOGENIZER

BACKGROUND OF THE INVENTION

1. Field of Invention

The present invention pertains to the field of optical systems. More particularly, this invention relates to an optical homogenizer.

2. Art Background

An optical system commonly includes a photon detector which generates an electrical signal in response to photons emitted from a light source. An example of a photon detector is a photo multiplier tube (PMT). A PMT includes a photo-cathode element which emits electrons in response to photons which strike it. A PMT also includes elements for multiplying, i.e. amplifying, the emitted electrons. The output of a typical PMT is an electrical signal that indicates the number of photons that strike its photo-cathode element which in turn indicates the brightness of a light source.

A photon detector is commonly characterized by its quantum efficiency. For example, the quantum efficiency of a PMT indicates the percentage of incident photons that cause photo-electric emission from its photo-cathode element. It is usually desirable to employ a photon detector with a high quantum efficiency. A high quantum efficiency usually yields a more sensitive photon detector because the sensitivity of a photon detector is a product of its quantum efficiency and its gain. A high sensitivity usually yields a higher signal to noise ratio in an optical system. In systems in which signal-to-noise ratio is limited by the Poissonian statistics of photons or photo-electrons, the signal to noise ratio may be improved by a higher quantum efficiency buy not by higher gain.

One type of photon detector known to have a relatively high quantum efficiency is referred to as a side-on PMT. A typical side-on PMT though providing relatively high quantum efficiency also has a non-uniform response along the length of its photo-cathode element. As a consequence, the sensitivity of a side-on PMT usually varies depending upon which area of its photo-cathode element is illuminated. Unfortunately, such a non-uniform response can make light sources of equal brightness appear to have differing brightness. This can cause errors in, for example, an imaging system in which light emanating from an image is scanned into a side-on PMT.

SUMMARY OF THE INVENTION

An optical homogenizer is disclosed which enables an optical system to obtain the benefits of a high quantum efficiency photon detector without suffering from its non-uniform response. The photon detector is one having a sensitivity which varies in at least one spatial dimension. The optical homogenizer is positioned between the photon detector and a light source. The optical homogenizer has an input end for receiving light emitted from the light source and an output end that produces a relatively uniform distribution of light along the spatial dimension of the photon detector. The optical homogenizer ensures that the photon detector receives a constant illumination distribution regardless of where photons from the light source enter the input end. The optical homogenizer has the advantage that changes in the response of the photon detector over time are automatically compensated.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
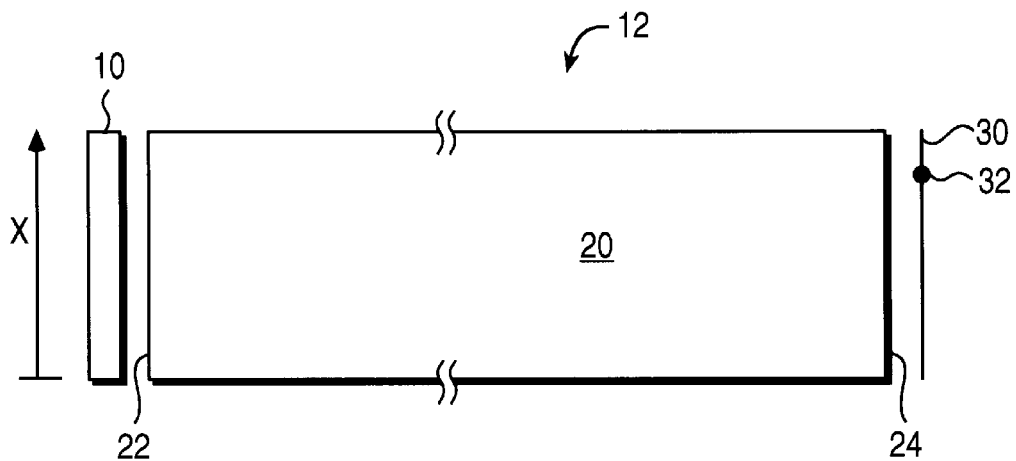
FIG. 1 shows an optical system which includes a non-uniform photon detector and an optical homogenizer.

FIG. 1 shows an optical system 12 which includes a non-uniform photon detector 10 and an optical homogenizer 20. The photon detector 10 is non-uniform in that its quantum efficiency varies along a spatial direction shown as the x dimension. The optical homogenizer 20 is positioned between the photon detector 10 and a spatially varying light source which is one embodiment is the image of a scan line 30.

In one embodiment, the photon detector 10 represents a photo-cathode element inside a side-on photo multiplier tube (PMT). The x dimension depicts the x dimension of a photo-cathode element in the side-on PMT. In other embodiments, the photon detector 10 may be another type of non-uniform photon detector.

The scan line 30 represents light emanating from an image surface (not shown). A scanning apparatus (not shown) scans the image surface in the x dimension with a laser beam. The scan line 30 represents the photons emitted from the image surface in response to the scanning laser beam. A point 32 of the scan line 30 represents the photons emitted from the image surface at a particular point in the scan. Over time, the point 32 moves up and down in the x dimension as the image surface is scanned.

The optical homogenizer 20 receives the photons associated with the point 32 at its input end through a surface 24. The optical homogenizer 20 guides the photons associated with the point 32 toward the photon detector 10 by total internal reflection within the optical homogenizer 20. An output end of the optical homogenizer 20 illuminates the photon detector 10 through a surface 22.

The divergent nature of the light rays from the point 32 combined with the internal reflections in the homogenizer 20 yield a relatively uniform illumination of the photon detector 10 in response to the point 32. This yields an averaging of sensitivity along the length of the photon detector 10 in the x dimension. As a consequence, the spatial variation of sensitivity of the optical system 12 is greatly reduced in comparison to a system without the optical homogenizer 20.

In one embodiment, the optical homogenizer 20 is a block of transparent material which may be a block of glass.

Figure 2A:
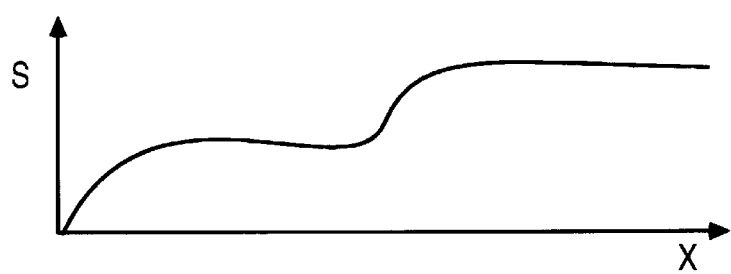
FIG. 2a shows a signal S yielded by a non-uniform photon detector in response to a constant brightness light source that moves along its x dimension.

FIG. 2a shows a signal S yielded by the photon detector 10 in response to a constant brightness light source that moves along its x dimension. This non-uniform response to a constant brightness light source in the absence of the optical homogenizer 20 would distort the measured brightness of a scanned image surface.

Figure 2B:
FIG. 2b shows that the brightness B at the output of the optical homogenizer is relatively uniform along the x dimension of the non-uniform photon detector.

FIG. 2b shows that the brightness B at the surface 22 of the optical homogenizer 20 in response to photons emitted from the point 32. The brightness B is relatively uniform along the x dimension of the photon detector 10. The brightness level $B_0$ is proportional to the brightness of light emitted from the point 32. As the intensity of photons from the point 32 increases the brightness level $B_0$ increases and as the intensity of photons from the point 32 decreases the brightness level $B_0$ decreases.

The relatively uniform brightness at the output surface 22 of the optical homogenizer 20 when combined with the non-uniform response of the photon detector 10 yields a relatively uniform overall response. The output signal E from the photon detector 10 when the optical homogenizer 20 is present may be expressed by a convolution of the functions shown in FIGS. 2a–2b according to the following equation:

$$E = \int_0^{x_0} B(x)S(x)dx$$

where E is an output electrical signal of the photon detector 10 and $X_0$ is the length of the photon detector 10 in the x direction.

Figure 3:
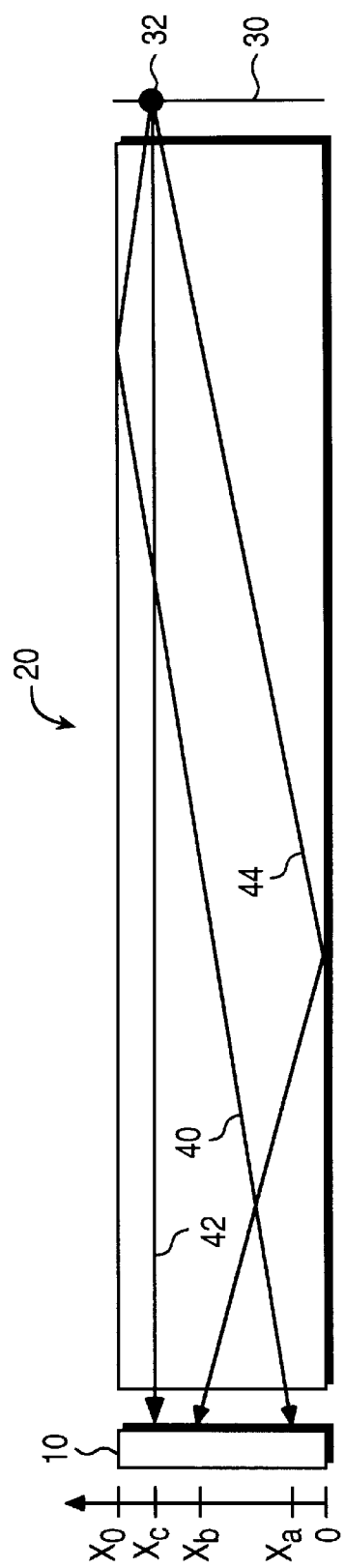
FIG. 3 shows the internal reflections in the optical homogenizer of a set of light rays that emanate from a point of a scan line.

FIG. 3 shows the internal reflections in the optical homogenizer 20 of a set of light rays 40–44 that emanate from the point 32 of the scan line 30. The light rays 40–44 strike the photon detector 10 at positions $x_a$, $x_c$, and $x_b$, respectively. The aggregate of light rays emanating from the point 32 result in a relatively constant illumination distribution of the photon detector 10 along its entire length from 0 to $x_0$. In addition, the illumination is proportional to the brightness of the point 32 due to the relatively lossless nature of the optical homogenizer 20 in the frequency range of interest.

Figures 4A, 4B:
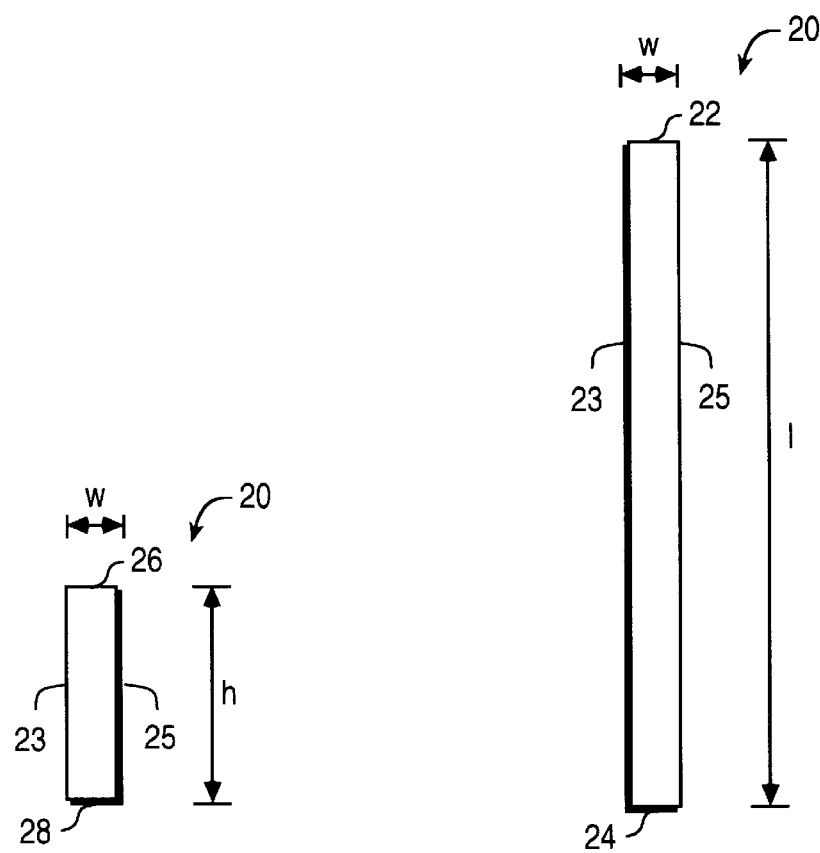
FIGS. 4a–c show differing views of one embodiment of the optical homogenizer which is a rectangular block having sharp edges.
Figure 4C:
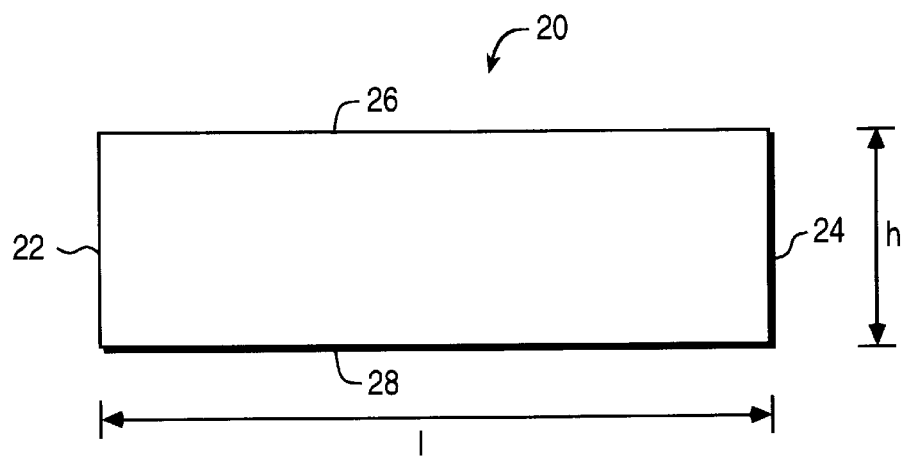

FIGS. 4a–c show differing views of one embodiment of the optical homogenizer 20 which is a rectangular block with sharp edges that guide light received at one end to an opposite end through total internal reflection. The dimensions of the optical homogenizer 20 include a height h, a length l, and a width w.

FIG. 4a shows a cross sectional view along the length of the optical homogenizer 20 in a direction from the surface 24 to the surface 22. FIG. 4b shows a top view of the optical homogenizer 20. FIG. 4c shows a side view of the optical homogenizer 20.

The height h, length l, and width w dimensions of the optical homogenizer 20 are preselected in view of a variety of conditions. The height h and the width w dimensions are based upon corresponding dimensions of the photon detector 10 and are preselected to provide illumination of the entire active area of the photon detector 10. In an embodiment where the photon detector 10 is a side-on PMT, the height h and the width w are based upon the dimensions of an entry slit to the photo-cathode element in the side-on PMT.

The length l is preselected to be high enough so that enough mixing occurs through total internal reflection in the optical homogenizer 20 to yield relatively uniform illumination of the photon detector 10. The length l is preselected to be low enough so that the optical homogenizer 20 fits within external mechanical constraints of the optical system 12.

The length l for purposes of adequate mixing depends on the divergence of the light from the point 32 and the length of the scan line 30. If the light source has high divergence then the length l may be reduced because high divergence yields more reflections and therefore greater mixing near the surface 24. The longer the scan line 30, the higher length l is to yield the same amount of mixing. The height and width are normally chosen big enough to accept, in the presence of alignment tolerances, all input that is desired to be propagated. They are normally chosen small enough to yield a light distribution smaller than, for example, the photo-cathode of the PMT. Smaller cross section results in better homogeneity.

In one embodiment, the height h is 16 millimeters, the width w is 2 millimeters, and the length l is 100 millimeters.

The angle tolerances for the optical homogenizer 20 in one embodiment are as follows. Non-parallelism between opposite surfaces, e.g. the surfaces 23 and 25, the surfaces 22 and 24, and the surfaces 26 and 28, is limited to 2 minutes maximum. Non-orthogonality between adjacent surfaces, e.g. the surfaces 22 and 26, the surfaces 23 and 24, and the surfaces 25 and 26, is limited to 10 minutes maximum.

The surfaces 22–28 of the optical homogenizer 20 may be polished so as to enhance internal reflections. The surface 22 and the surface 24 of the optical homogenizer 20 may be coated with an anti-reflective material which minimizes losses that may be caused by reflection as light rays enter at the surface 24 and exit at the surface 22.

In one embodiment, the frequencies of interest in the scan line 30 are defined by a wavelength range between 500 and 600 nanometers. The optical homogenizer 20 has a refractive index between 1.45 and 1.55 at 550 nanometers and between 1.40 and 1.60 over the wavelength range of 500 and 600 nanometers in this embodiment. These tolerances can be loosened as long as losses due to loss of total internal reflection remain at an acceptable level.

The optical homogenizer 20 has a relatively small loss due to scattering. In one embodiment, the optical homogenizer 20 provides 97 percent transmission between the surfaces 22 and 24.

In another embodiment, the surfaces of the optical homogenizer 20 are not essentially parallel but are instead used to change the cross section of the light emerging to the photon detector 10.

In either embodiment, a scattering element such as ground glass may be placed at the surface 24 so as to enhance mixing. This may be particularly suitable for optical systems in which space constraints limit the length of the optical homogenizer 20.

In another embodiment, the optical homogenizer 20 is a randomized fiber bundle which functions as a light guide and a homogenizer. The fiber bundle may have a changing cross section for changing the cross section of the light emerging to the photon detector 10.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. An optical system, comprising:

photon detector having an active area with a sensitivity which varies in at least one spatial dimension of the active area;

optical homogenizer having an input end for receiving light emitted from a light source wherein a position of the light source varies along at least one spatial dimension of the input end and having an output end at which it produces a relatively uniform distribution of light along the spatial dimension of the active area of the photon detector in response to the light source by conducting the light emitted from the light source to the output end through internal reflections within the optical homogenizer wherein the optical homogenizer has a length between the input and output ends which is preselected to enhance optical mixing through internal reflections.

2. The optical system of claim 1, wherein the photon detector is side-on photo-multiplier tube.

3. The optical system of claim 1, wherein the optical homogenizer is a block of transparent material.

4. The optical system of claim 3, wherein the transparent material is glass.

5. The optical system of claim 3, wherein the block of transparent material has polished surfaces which enhance total internal reflection within.

6. The optical system of claim 3, wherein a surface of the block of transparent material corresponding to the input end has a coating of anti-reflective material.

7. The optical system of claim 3, wherein a surface of the block of transparent material corresponding to the output end has a coating of anti-reflective material.

8. The optical system of claim 1, wherein the length between the input and output ends is preselected based upon a divergence of the source.

9. The optical system of claim 1, wherein the light source is a point from a scan line of an image being scanned.

10. The optical system of claim 1, wherein the length between the input and output ends is preselected based upon a length of the scan line.

11. The optical system of claim 1, further comprising a scattering element at the input end of the optical homogenizer.

12. The optical system of claim 1, wherein the optical homogenizer is a randomized fiber bundle which functions as a light guide and a homogenizer.

13. The optical system of claim 1, wherein the optical homogenizer has a cross-section which varies between the input and output ends.

14. An optical homogenizer having an input end for receiving light emitted from a light source wherein a position of the light source varies along at least one spatial dimension of the input end and having an output end at which it produces a relatively uniform distribution of light along a spatial dimension of the output end in response to the light source by conducting the light emitted from the light source to the output end through internal reflections within the optical homogenizer wherein the spatial dimension of the output end corresponds to a spatial dimension of varying sensitivity in an active area of a photon detector and wherein the optical homogenizer has a length between the input and output ends which is preselected to enhance optical mixing through internal reflections.

15. The optical homogenizer of claim 14, wherein the optical homogenizer is a block of transparent material.

16. The optical homogenizer of claim 15, wherein the transparent material is glass.

17. The optical homogenizer of claim 15, wherein the block of transparent material has polished surfaces which enhance total internal reflection within.

18. The optical homogenizer of claim 15, wherein a surface of the block of transparent material corresponding to the input end has a coating of anti-reflective material.

19. The optical homogenizer of claim 15, wherein a surface of the block of transparent material corresponding to the output end has a coating of anti-reflective material.

20. The optical homogenizer of claim 14, wherein the optical homogenizer is a randomized fiber bundle which functions as a light guide and a homogenizer.

21. The optical homogenizer of claim 14, wherein the optical homogenizer has a cross-section which varies between the input and output ends.

* * * * *